(12) United States Patent
Yoneyama (10) Patent No.: US 7,256,946 B2
(45) Date of Patent: Aug. 14, 2007

(54) ZOOM LENS HAVING A WIDE ANGLE OF VIEW AND A HIGH ZOOMING RATIO AND A CAMERA EMPLOYING THE SAME

(75) Inventor: Shuji Yoneyama, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 11/487,932

(22) Filed: Jul. 17, 2006

(65) Prior Publication Data

US 2007/0091459 A1 Apr. 26, 2007

(30) Foreign Application Priority Data

Oct. 13, 2005 (KR) .................. 10-2005-0096500

(51) Int. Cl.
G02B 15/14 (2006.01)
(52) U.S. Cl. ................. 359/686; 359/683; 359/714; 359/740; 359/763; 359/766
(58) Field of Classification Search ............. 359/676, 359/683, 686, 714, 740, 763, 766
See application file for complete search history.

(56) References Cited

U.S. PATENT DOCUMENTS

2003/0165020 A1* 9/2003 Satori et al. ............. 359/686

FOREIGN PATENT DOCUMENTS

| JP | 10-111457 A | 4/1998 |
| JP | 2001-350093 A | 12/2001 |
| JP | 2003-255228 A | 9/2003 |
| JP | 2003-287681 A | 10/2003 |

* cited by examiner

Primary Examiner—Evelyn A. Lester
(74) Attorney, Agent, or Firm—Drinker Biddle & Reath LLP

(57) ABSTRACT

A zoom lens with a wide angle of view and a high zooming ratio and a camera employing the zoom lens. The zoom lens includes a first lens group having a positive refractive power, a second lens group having a negative refractive power, a third lens group having a positive refractive power, a fourth lens group having a negative refractive power, and a fifth lens group having a positive refractive power, wherein the first through fifth lens groups are sequentially arranged from an object side toward an image side. The first through fifth lens groups are moved during zooming between wide angle position to telephoto position in a manner that increases the distances between the first and second lens groups, between the third and fourth lens groups, and between the fourth and fifth lens groups and decreases a distance between the second and third lens groups. The zoom lens includes the five lens groups that are positive, negative, positive, negative, and positive, respectively, thus achieving a wide angle of view and a high zooming ratio.

16 Claims, 10 Drawing Sheets

ZOOM LENS HAVING A WIDE ANGLE OF VIEW AND A HIGH ZOOMING RATIO AND A CAMERA EMPLOYING THE SAME

CROSS-REFERENCE TO RELATED PATENT APPLICATION

This application claims the benefit of Korean Patent Application No. 10-2005-0096500, filed on Oct. 13, 2005, in the Korean Intellectual Property Office, the disclosure of which is incorporated herein in its entirety by reference.

BACKGROUND OF THE INVENTION

1. Field of the Invention

The present invention relates to a zoom lens having a wide angle of view and a high zooming ratio, and a camera employing the same.

2. Description of the Related Art

Digital still cameras (DSCs) are now being widely used to photograph images. A zoom lens including three lens groups having negative, positive, and positive refractive powers and with a half field angle of 29° to 32° at a wide angle and a 3× zooming ratio is commonly being used in a digital camera due to its small lens diameter or short overall length. A current silver gelatin single-lens reflex (SLR) camera using 35 mm film is equipped with standard zoom lenses having highly sophisticated functions, a focal length (wide angle) of 24 mm at a wide angle position at a half field angle of about 42° that is shortened from 28 mm at a half field angle of about 37°, and a zoom ratio of 8× at about 24-200 mm focal length that is increased from about 7× at a 28-200 mm focal length.

Thus, to achieve a wide angle and a high zooming ratio for a digital camera, a zoom lens including five lens groups with positive, negative, positive, negative, and positive refractive powers have been employed to permit flexibility in selecting a wide range of designs.

Figure 1:
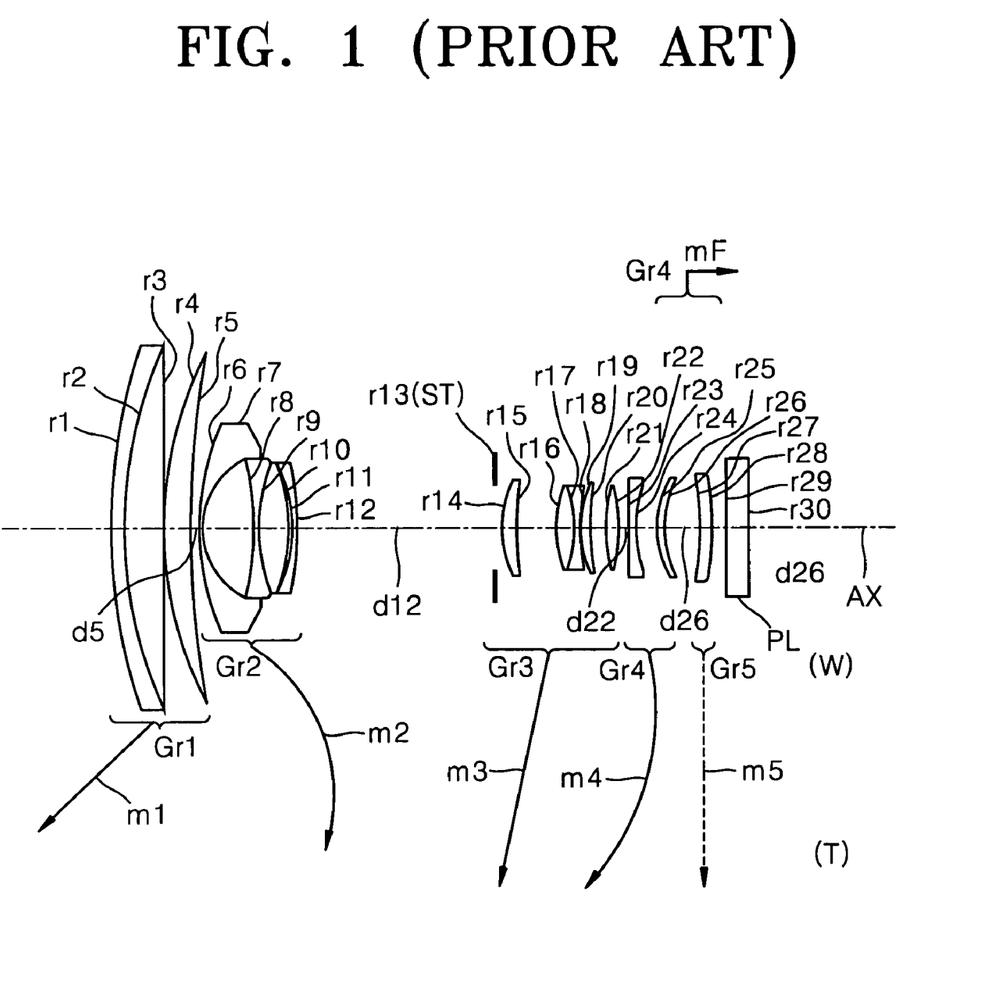
FIG. 1 illustrates a conventional zoom lens disclosed in Japanese Laid-Open Patent Application No. 2001-350,093.

FIG. 1 illustrates a five lens group zoom lens disclosed in Japanese Laid-Open Patent Application No. 2001-350,093.

Referring to FIG. 1, the zoom lens includes first through fifth lens group Gr1 through Gr5 having positive, negative, positive, negative, and positive refractive powers that are sequentially arranged from an object side toward an image side. While the zoom lens has a high zooming ratio from 7× to 10×, it does not provide a wide angle of view because the maximum half field angle at a wide angle position is about 38°.

Another example of a five lens group zoom lens proposed in Japanese Laid-Open Patent Application No. 2003-255,228 also has a high zooming ratio from 5× to 10×. In an embodiment providing the maximum wide angle, however, a zooming ratio is about 5× for a half field angle of about 38° at a wide angle position. Thus, the zoom lens does not satisfy both wide angle and high zooming ratio requirements. Yet another example of a zoom lens presented in Japanese Laid-Open Patent Application No. 2003-287,681 provides a high zooming ratio of 10× but inadequate half field angle of only about 32° at a wide angle position.

SUMMARY OF THE INVENTION

The present invention provides a zoom lens with a wide angle of view and a high zooming ratio.

According to an aspect of the present invention, there is provided a zoom lens that includes a first lens group having a positive refractive power; a second lens group having a negative refractive power; a third lens group having a positive refractive power; a fourth lens group having a negative refractive power; and a fifth lens group having a positive refractive power, wherein the first through fifth lens groups are sequentially arranged from an object side toward an image side. The first through fifth lens groups are moved during zooming between wide angle position to telephoto position in a manner that increases the distances between the first and second lens groups, between the third and fourth lens groups, and between the fourth and fifth lens groups, and decreases the distance between the second and third lens groups. The fourth lens group includes a positive lens and a negative lens arranged sequentially from the object side. The positive lens in the fourth lens group is a positive meniscus lens having a concave surface toward the object side. The positive lens may be separated from the negative lens by an air gap.

According to another aspect of the present invention, there is provided a zoom lens that includes a first lens group having a positive refractive power; a second lens group having a negative refractive power; a third lens group having a positive refractive power; a fourth lens group having a negative refractive power; and a fifth lens group having a positive refractive power, wherein the first through fifth lens groups are sequentially arranged from an object side toward an image side.

The first through fifth lens groups are moved during zooming between wide angle position to telephoto position in a manner that increases the distances between the first and second lens groups, between the third and fourth lens groups, and between the fourth and fifth lens groups, and decreases the distance between the second and third lens groups. The fifth lens group includes a single lens.

The fourth lens group may include a positive meniscus lens having a concave surface toward the object side and a negative lens separated from the positive meniscus lens by an air gap. The positive meniscus lens and the negative lens are arranged sequentially from the object side toward the image side.

The second lens group may satisfy $$-0.65 < \frac{f_w}{f_2} < -0.54,$$

where $f_w$ and $f_2$ are an entire focal length at a wide angle position and a focal length of the second lens group, respectively.

The fourth lens group may satisfy $$-0.6 < \frac{f_w}{f_4} < -0.32,$$

where $f_w$ and $f_4$ are an entire focal length at a wide angle position and a focal length of the fourth lens group, respectively.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 2:
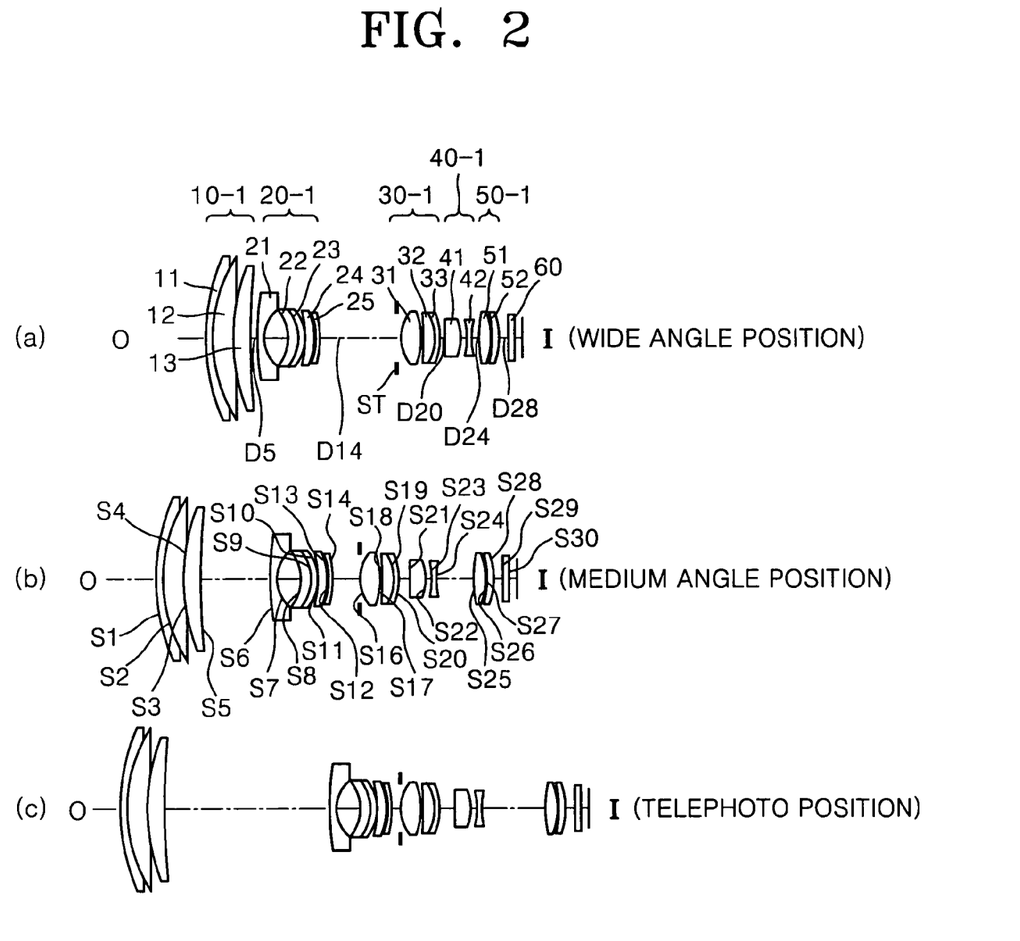
FIGS. 2A-2C illustrate structures of a zoom lens with a wide angle of view and a high zooming ratio at a wide angle position, a medium angle position, and a telephoto position, respectively, according to an embodiment of the present invention.

Referring to FIG. 2, a zoom lens according to an embodiment of the present invention includes, sequentially from an object side, a first lens group 10-1 having a positive refractive power; a second lens group 20-1 having a negative refractive power; a third lens group 30-1 having a positive refractive power; a fourth lens group 40-1 having a negative refractive power; and a fifth lens group 50-1 having a positive refractive power. The first through fifth lens groups 10-1, 20-1, 30-1, 40-1, and 50-1 are moved during zooming between wide angle position to telephoto position in a manner that increases the distances between the first and second lens groups 10-1 and 20-1, between the third and fourth lens groups 30-1 and 40-1, and between the fourth and fifth lens groups 40-1 and 50-1, and decreases the distance between the second and third lens groups 20-1 and 30-1.

To achieve a high zooming ratio, the first lens group 10-1 may have a positive refractive power and the distance between the first and second lens groups 10-1 and 20-1 may be increased. Furthermore, to suppress aberrations caused by a wide angle of view and a high zooming ratio, the zoom lens of the present invention includes the five lens groups to increase flexibility in selecting a wide range of designs. In particular, the distance between the positive third lens group 30-1 and the negative fourth lens group 40-1 is increased to compensate for the astigmatic field curvature that worsens with increasing angle. The zoom lens is configured such that the third and fourth lens groups located behind the second lens group 20-1 as a master lens group have positive and negative refractive powers, thus suppressing an increase in the number of lenses in the master lens group for correction of aberrations. This suppresses an increase in the overall length of an optical system, thus achieving a compact zoom lens. Further, when light is incident obliquely on an image plane of an imaging device such as a charge-coupled device (CCD), kerare (or vignetting) occurs due to the fine structure of the image plane. Thus, to prevent kerare, light must be incident almost perpendicular to the imaging surface. The kerare occurs because the optical path of an optical system is obstructed by an optical structure so that light is not incident on a CCD when a telecentric angle of the optical system does not match a combination of microlenses in the imaging device. In the current embodiment, to prevent kerare, the fifth lens group 50-1 may be moved to control an angle at which light is incident on an image plane.

The second lens group 20-1 may satisfy a condition expressed by Equation (1):

$$-0.65 < \frac{f_w}{f_2} < -0.54 \qquad (1)$$

where $f_w$ and $f_2$ are an entire focal length at a wide angle position and a focal length of the second lens group 20-1, respectively. The second lens group 20-1 has a high refractive power and functions to change magnification. When a ratio expressed by the Equation (1) exceeds the maximum limit so that the negative refractive power of the second lens group 20-1 is decreased, it is difficult to construct a lens barrel because the distance between the first and second lens groups 10-1 and 20-1 is changed excessively to change magnification and the entire lens system at a telephoto position becomes excessively large. Because the distance between the first and second lens groups 10-1 and 10-2 is decreased at a wide angle position, a retro focus lens construction is employed to achieve a wider angle of view. When the refractive power of the second lens group 20-1 is decreased, however, retro focus lens construction is difficult and no space is provided to locate a filter in front of an image plane. Conversely, when the ratio is less than the minimum limit so that the negative refractive power of the second lens group 20-1 becomes excessively high, the Petzval sum of the entire lens system decreases and spherical aberration of the entire lens system is overcorrected due to positive spherical aberrations.

The third lens group 30-1 includes, sequentially from an object side, a double convex lens having an aspherical surface and a doublet consisting of a positive lens having a strong convex surface toward an image I and a negative meniscus lens, while the fourth lens group 40-1 includes a positive meniscus lens having a concave surface toward an object O and a negative lens separated from the positive meniscus lens by an air gap.

The fourth lens group 40-1 may satisfy a condition expressed by Equation (2):

$$-0.6 < \frac{f_w}{f_4} < -0.32 \qquad (2)$$

where $f_w$ and $f_4$ are an entire focal length at a wide angle position and a focal length of the fourth lens group 40-1, respectively. The Equation (2) defines the refractive power of the fourth lens group 40-1. When a ratio expressed by the Equation (2) exceeds the maximum limit so that the negative refractive power of the fourth lens group 40-1 is decreased, the entire length of the zoom lens is increased because the effect reducing the entire length by forming a telephoto type is weakened. When the ratio is less than the minimum limit so that the negative refractive power of the fourth lens group is increased, the telephoto type gets excessively strong and manufacturing error sensitivity such as eccentricity is increased, thus making it difficult to manufacture the zoom lens.

The positive lenses in the third and fourth lens groups 30-1 and 40-1 may satisfy conditions expressed by Equations (3) and (4):

$$1.49 < N_{3,4gp} < 1.53 \qquad (3)$$

$$70 < V_{3,4gp} < 80 \qquad (4)$$

where $N_{3,4gp}$ denotes a refractive index for d-Line of the positive lenses in the third and fourth lens groups 30-1 and 40-1 and $V_{3,4gp}$ denotes an Abbe number for d-Line of the positive lenses in the third and fourth lens groups 30-1 and 40-1.

A Petzval sum in a lens system should be kept at an appropriate level such that the second lens group 20-1 has a large negative Petzval sum and a high negative refractive power. The Petzval sum refers to the sum of ratios of the refractive indices to the power of each lens surface and comes from expanding the amount of third-order field curvature (in third order). As the Petzval sum increases, the amount of field curvature increases. To keep the Petzval sum at an appropriate level, the material of a lens is selected such that the refractive index for d-Line does not exceed the maximum limit shown in the Equation (3), thereby increasing a positive Petzval sum. When the refractive index exceeds the maximum limit, the positive Petzval sum decreases, while when the refractive index exceeds the minimum limit, the positive Petzval sum increases. Thus, it is impossible to keep the Petzval sum of the lens system at appropriate level. Equation (4) defines conditions for selecting a material to eliminate chromatic aberrations in combination with the Equation (3).

A material is selected in the range defined by the Equation (4) to keep chromatic aberrations of the overall lens system to an appropriate level over the entire zoom range. Because it is typically difficult to find a material having a large Abbe number and a high refractive index, the material cannot be selected to satisfy the Equation (4) when the refractive index exceeds the maximum limit. Furthermore, when the Abbe number defined by the Equation (4) exceeds the minimum limit, the chromatic aberration of the entire lens system cannot be kept at an approximate level over the entire zoom range. When the Abbe number exceeds the maximum limit, it is advantageous to eliminate chromatic aberrations, but an optical material having a large Abbe number is expensive. Special crystal or glass used as an optical material having a large Abbe number is expensive because it contains a high-cost raw material.

The optical material of a lens in the fourth lens group 40-1 may be selected to satisfy a condition expressed by Equation (5) as well as the conditions defined by the Equations (3) and (4):

$$0 < V_{4gp} - V_{4gn} < 47 \qquad (5)$$

where $V_{4gp}$ and $V_{4gn}$, respectively, denote Abbe numbers of positive and negative lenses in the fourth lens group 40-1.

Separate achromatism is typically conducted to correct color for individual lens group in a zoom lens. In the present invention, however, because an optical material is selected to eliminate chromatic aberrations generated in the third and fourth lens groups 30-1 and 40-1 as shown in the Equations (3) and (4), a material having a large Abbe number is selected for a positive lens, while a material having a small Abbe number is selected for a negative lens although the fourth lens group 40-1 has a negative refractive power. When the maximum limit defined by Equation (5) is exceeded, a material cannot be selected within a range of typical optical materials. The use of special material also results in high manufacturing costs or makes high volume production difficult. Furthermore, a balance of eliminating chromatic aberrations in the entire third and fourth lens groups is degraded and chromatic aberrations are difficult to appropriately adjust over the entire zoom range. Conversely, when the minimum limit is exceeded, it is difficult to eliminate chromatic aberrations in the third and fourth lens groups 30-1 and 40-1 while satisfying the conditions defined by the Equations (3) and (4).

Equation (6) defines an aspherical shape used in the current embodiment. When an optical axis is set as an X-axis, a line perpendicular to the optical axis is set as a Y-axis, and a propagation direction of a light beam is defined as being positive, the aspherical shape of the zoom lens according to the present embodiment can be defined by Equation (6):

$$x \cong \frac{cy^2}{1 + \sqrt{1 - (K+1)c^2 y^2}} + Ay^4 + By^6 + Cy^8 + Dy^{10} \qquad (6)$$

where "x" is a distance from a vertex of a lens in an X-axis direction; "y" is a distance from the vertex of the lens in a Y-axis direction; K is a conic constant; A, B, C, and D are aspheric coefficients; and "c" is a reciprocal of the radius of curvature, 1/R, at the vertex of the lens.

Zoom lenses according to the following embodiments use various designs including lenses satisfying optimum conditions to provide a wider angle of view and high zooming ratio. The following Tables specify detailed lens data for zoom lenses according to the embodiments of the present invention.

First Embodiment

Hereinafter, "f" is a combined focal length of an entire lens system, Fno is an F number, ω is a half field angle, R is radius of curvature, D is a thickness of a center of a lens or a distance between lenses, Nd is a refractive index, and Vd is an Abbe number.

FIGS. 2A-2C illustrates the zoom lens according to the first embodiment of the present invention. FIG. 2A illustrates the zoom lens at a wide angle position, FIG. 2B illustrates the zoom lens at a medium angle position, and FIG. 2C illustrates the zoom lens at a telephoto position.

Referring to FIG. 2A, the first lens group 10-1, the second lens group 20-1, the third lens group 30-1, the fourth lens group 40-1, and the fifth lens group 50-1 are sequentially arranged from the object O toward the image I. Each of the first through fifth lens groups 10-1 through 50-1 may include a single lens or a plurality of lenses. Reference numeral 60 denotes a red filter.

The first lens group 10-1 includes first through third lenses 11 through 13 and the second lens group 20-1 includes fourth through eighth lenses 21 through 25. The third lens group 30-1 includes a double convex lens 31 having an aspherical surface and a doublet consisting of a positive lens 32 having a strong convex surface toward the image I and a negative meniscus lens 33. The fourth lens group 40-1 includes a positive meniscus lens 41 having a concave surface toward the object O and a negative lens 42 separated from the positive meniscus lens 41 by an air gap. The fifth lens 50-1 includes ninth and tenth lenses 51 and 52.

The first through fifth lens groups 10-1 through 50-1 are moved to change magnification. During zooming from the wide angle position to the telephoto position, the distances between the first and second lens groups 10-1 and 20-1, between the third and fourth lens groups 30-1 and 40-1, and between the fourth and fifth lens groups 40-1 and 50-1 are increased, while the distance between the second and third lens groups 20-1 and 30-1 is decreased.

A stop ST is placed between the second and third lens groups 20-1 and 30-1 and is moved together with the third lens group 30-1.

Table 1 shows detailed lens data for the zoom lens according to the first embodiment of the present invention.

TABLE 1

| Lens surface | R | D | Nd index (Nd)i (Nd) | Vd |
|---|---|---|---|---|
| S1 | 51.081 | 1.00 | 1.84666 | 23.8 |
| S2 | 36.445 | 3.96 | 1.48749 | 70.2 |
| S3 | 175.805 | 0.10 | | |
| S4 | 40.466 | 3.50 | 1.49700 | 81.5 |
| S5 | 219.467 | Variable(D5) | | |
| S6 | 300.000 | 1.30 | 1.80500 | 40.7 |
| S7 | 7.228 | 4.80 | | |
| S8 | −9.396 | 2.40 | 1.84666 | 23.8 |
| S9 | −7.756 | 1.00 | 1.80400 | 46.6 |
| S10 | −12.198 | 0.10 | | |
| S11 | −27.523 | 1.96 | 1.84666 | 23.8 |
| S12 | −13.008 | 0.41 | | |
| S13 | −10.143 | 0.90 | 1.83481 | 42.7 |
| S14 | −35.660 | (Variable(D14) | | |
| ST | Infinite | 0.80 | | |
| S16 | 9.069 | 4.00 | 1.52540 | 70.4 |
| S17 | −13.504 | 0.24 | | |
| S18 | −82.070 | 2.54 | 1.49700 | 81.5 |
| S19 | −9.464 | 1.05 | 1.84666 | 23.8 |
| S20 | −12.363 | Variable(D20) | | |
| S21 | −22.552 | 3.17 | 1.48749 | 70.2 |
| S22 | −9.481 | 1.12 | | |
| S23 | −16.805 | 1.00 | 1.83824 | 24.8 |
| S24 | 12.250 | Variable(D24) | | |
| S25 | 32.645 | 2.50 | 1.48749 | 70.2 |
| S26 | −11.691 | 0.10 | | |
| S27 | −18.816 | 1.42 | 1.83400 | 37.2 |
| S28 | −16.210 | Variable(D28) | | |
| S29 | Infinite | 1.22 | 1.51680 | 64.2 |
| S30 | Infinite | fb | | |

Table 2 shows aspheric coefficients of the zoom lens according to the first embodiment of the present invention.

TABLE 2

| Lens surface | K | A | B | C | D |
|---|---|---|---|---|---|
| S6 | −1.000 | 1.52320E−04 | −9.99270E−07 | 3.72510E−09 | 2.39700E−11 |
| S16 | −1.000 | −1.49930E−04 | −2.07290E−06 | −7.37600E−08 | 0.00000E+00 |
| S17 | −1.000 | 1.53660E−04 | −3.06820E−06 | −5.45260E−08 | 0.00000E+00 |
| S23 | −1.000 | −7.82630E−04 | −2.17860E−05 | 4.27850E−07 | 0.00000E+00 |

Table 3 shows examples of focal length, F number, half field angle, and variable distances D5, D14, D20, D24, and D28 at the wide angle position, the medium angle position, and the telephoto position in the zoom lens according to the first embodiment of the present invention.

TABLE 3

| | Wide angle | Medium angle | Telephoto |
|---|---|---|---|
| f | 4.14 | 11.50 | 32.04 |
| Fno | 2.90 | 3.20 | 3.93 |
| ω (°) | 43.1 | 17.5 | 6.6 |
| D5 | 1.000 | 13.635 | 32.628 |
| D14 | 15.825 | 4.981 | 1.000 |
| D20 | 1.000 | 2.301 | 3.448 |
| D24 | 1.500 | 7.142 | 13.240 |

TABLE 3-continued

|  | Wide angle | Medium angle | Telephoto |
|---|---|---|---|
| D28 | 1.990 | 2.066 | 1.000 |
| fb | 1.100 | 1.100 | 1.100 |

Figure 3A:
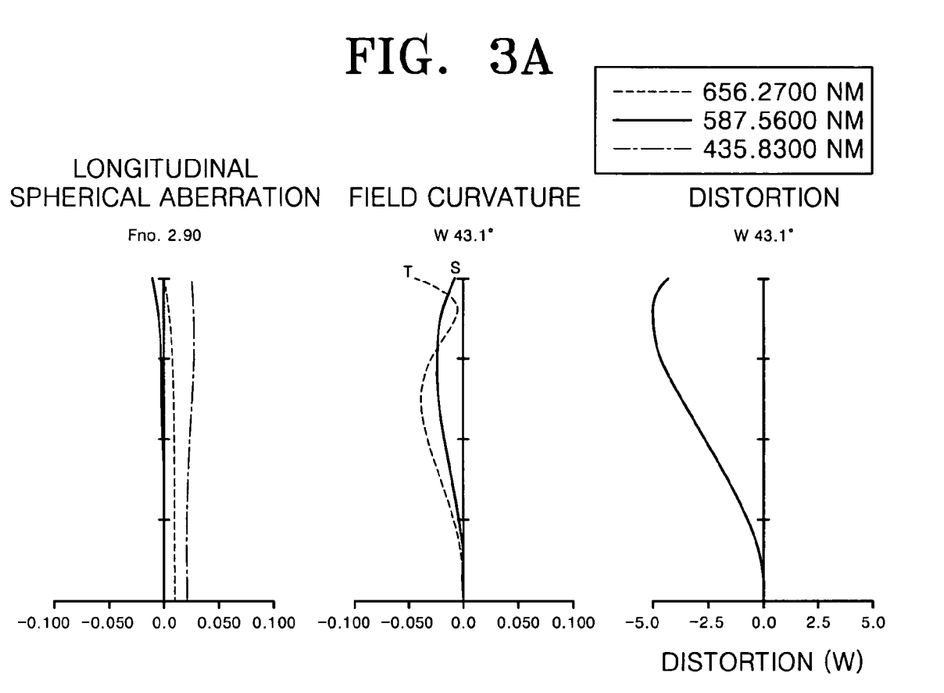
FIG. 3A illustrates spherical aberration, astigmatic field curvature, and distortion at the wide angle position of the zoom lens according to the embodiment illustrated in FIGS. 2A-2C.
Figure 3B:
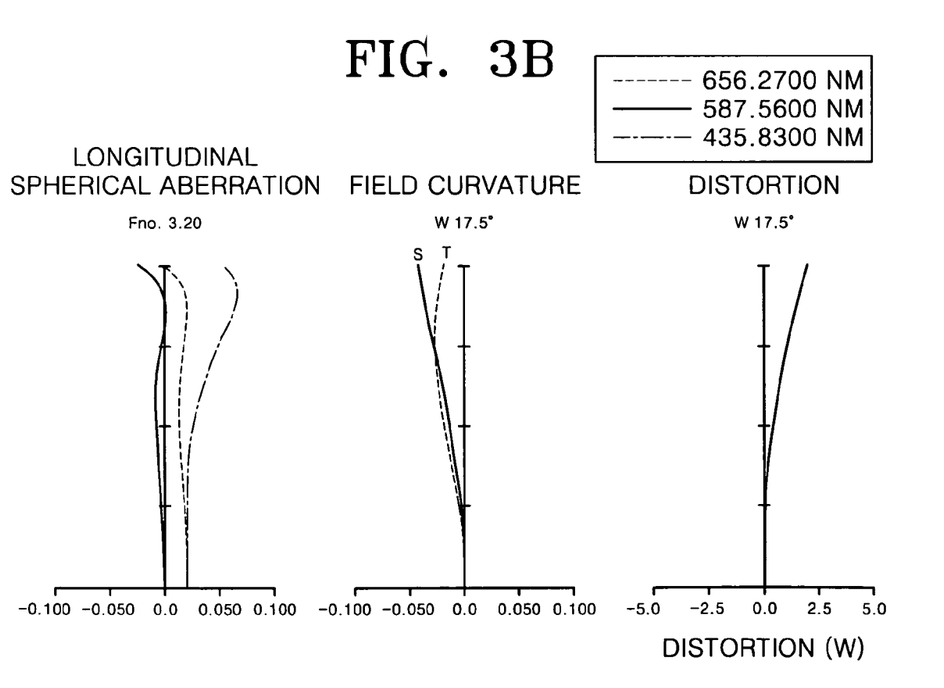
FIG. 3B illustrates the spherical aberration, astigmatic field curvature, and distortion at the media angle position of the zoom lens according to the embodiment illustrated in FIGS. 2A-2C.
Figure 3C:
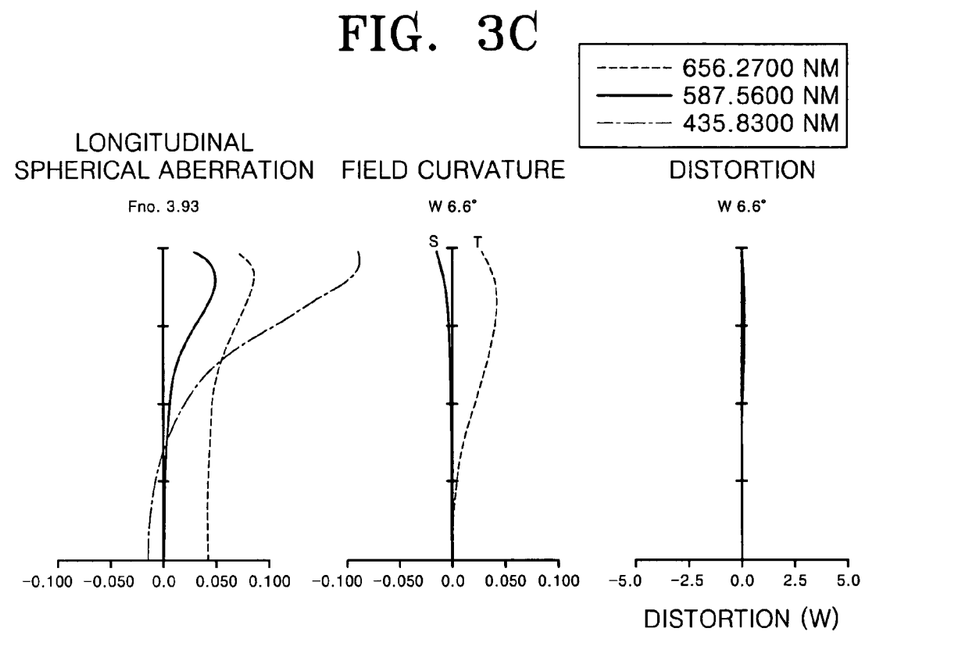
FIG. 3C illustrates the spherical aberration, astigmatic field curvature, and distortion at the telephoto position of the zoom lens according to the embodiment illustrated in FIGS. 2A-2C.
Figure 4:
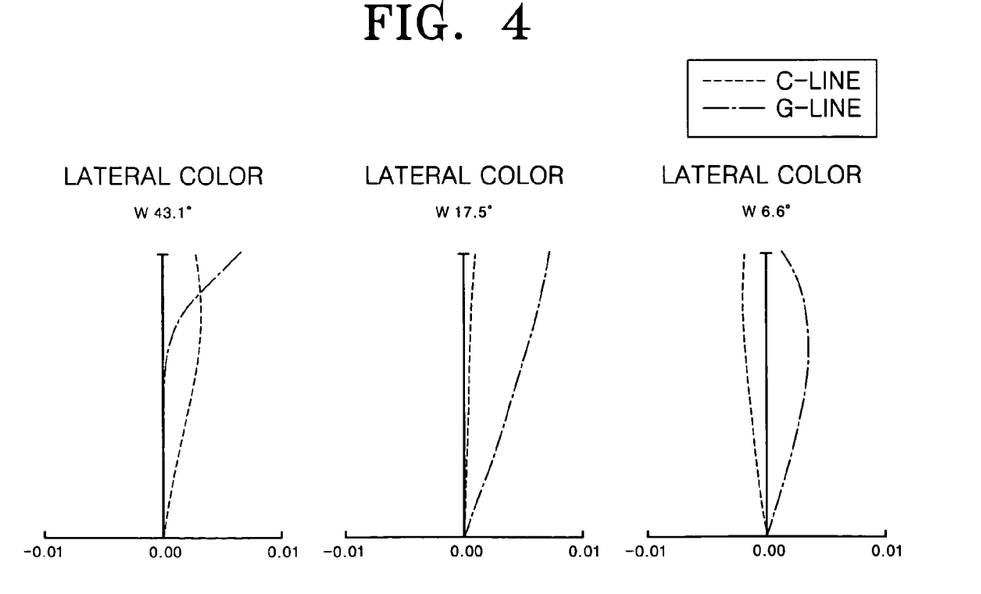
FIG. 4 illustrates lateral colors at the wide angle position, the medium angle position, and the telephoto position of the zoom lens according to the embodiment illustrated in FIGS. 2A-2C.

FIGS. 3A-3C illustrate longitudinal spherical aberration, astigmatic field curvature, and distortion at the wide angle position, the media angle position, the telephoto position of the zoom lens according to the first embodiment of the present invention.

Second Embodiment

Figure 5:
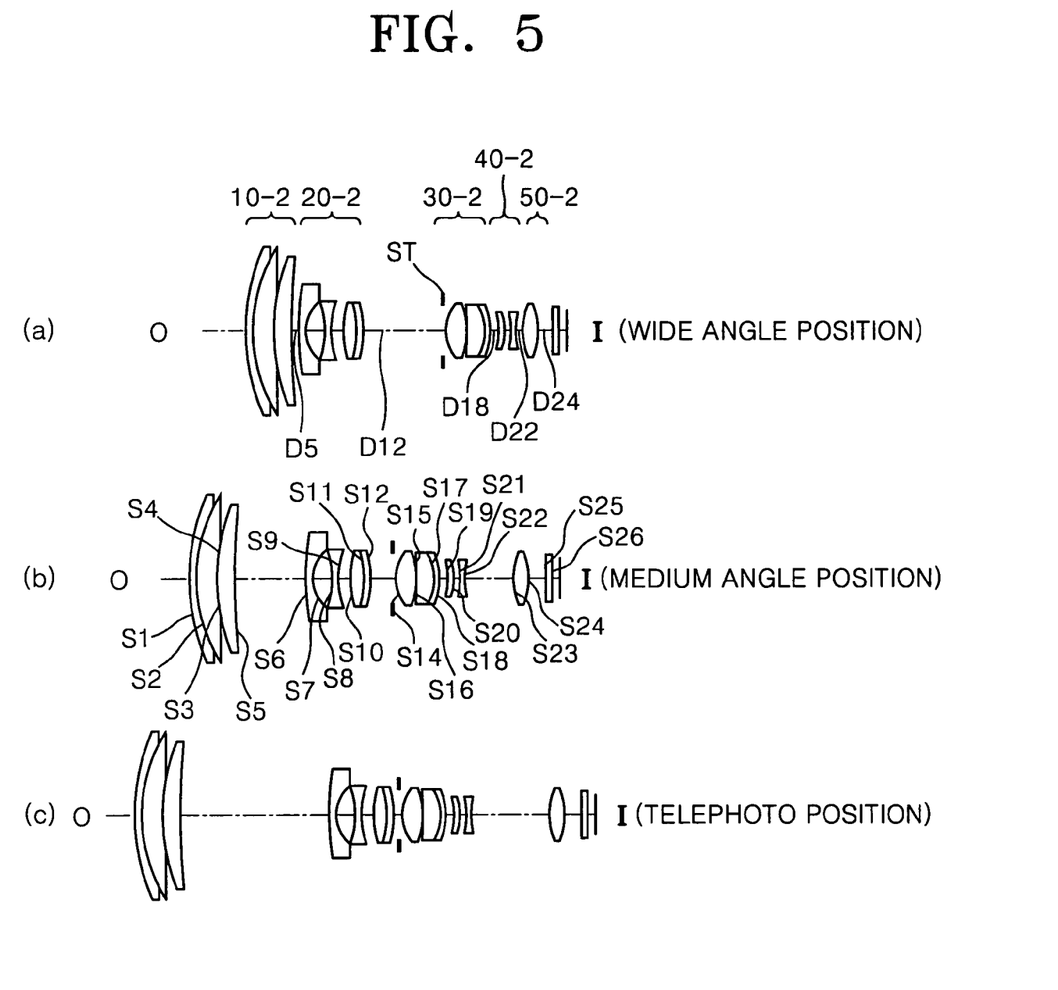
FIGS. 5A-5C illustrate structures of a zoom lens with a wide angle of view and a high zooming ratio at a wide angle position, a medium angle position, and a telephoto position, respectively, according to another embodiment of the present invention.

FIGS. 5A-5C illustrate structures of a zoom lens with a wide angle of view and a high zooming ratio at a wide angle position, a medium angle position, and a telephoto position, respectively, according to a second embodiment of the present invention. The zoom lens according to the current embodiment includes first through fifth lens groups 10-2 through 50-2.

TABLE 4

| Lens surface | R | D | Nd | Vd |
|---|---|---|---|---|
| S1 | 49.132 | 1.00 | 1.84666 | 23.8 |
| S2 | 35.490 | 4.88 | 1.48749 | 70.2 |
| S3 | 400.839 | 0.10 | | |
| S4 | 43.208 | 3.16 | 1.49700 | 81.5 |
| S5 | 149.150 | Variable (D5) | | |
| S6 | 42.056 | 1.30 | 1.83481 | 42.7 |
| S7 | 7.452 | 4.11 | | |
| S8 | −21.420 | 1.25 | 1.80470 | 41.0 |
| S9 | 12.354 | 2.16 | | |
| S10 | 41.815 | 2.49 | 1.84666 | 23.8 |
| S11 | −17.511 | 1.00 | 1.77250 | 49.6 |
| S12 | −37.436 | Variable (D12) | | |
| ST | Infinite | 0.80 | | |
| S14 | 10.372 | 3.72 | 1.52540 | 70.4 |
| S15 | −9.666 | 0.14 | | |
| S16 | −27.271 | 4.50 | 1.49700 | 81.5 |
| S17 | −6.583 | 1.28 | 1.84666 | 23.8 |
| S18 | −8.507 | Variable (D18) | | |
| S19 | −9.788 | 1.47 | 1.48749 | 70.2 |
| S20 | −7.992 | 1.37 | | |
| S21 | −17.081 | 1.00 | 1.83819 | 24.8 |
| S22 | 12.320 | Variable (D22) | | |
| S23 | 17.694 | 2.94 | 1.51680 | 64.2 |
| S24 | −14.846 | Variable (D24) | | |
| S25 | Infinite | 1.22 | 1.51680 | 64.2 |
| S26 | Infinite | fb | | |

Table 5 shows aspheric coefficients of the zoom lens according to the second embodiment of the present invention.

TABLE 5

| Lens surface | K | A | B | C | D |
|---|---|---|---|---|---|
| S9 | −1.000 | −1.04756E−04 | 2.07057E−07 | 7.42278E−08 | −1.31780E−09 |
| S14 | −1.000 | −2.81949E−04 | −6.23993E−06 | −1.10578E−07 | 0.00000E+00 |
| S15 | −1.000 | 1.15469E−04 | −6.14473E−06 | 0.00000E+00 | 0.00000E+00 |
| S21 | −1.000 | −7.05040E−04 | −1.12680E−05 | −2.92203E−07 | 0.00000E+00 |

Table 6 shows examples of variable distances D5, D12, D18, D22, and D24 at the wide angle position, the medium angle position, and the telephoto position in the zoom lens according to the second embodiment of the present invention.

TABLE 6

|  | Wide angle | Medium angle | Telephoto |
|---|---|---|---|
| f | 4.14 | 11.50 | 32.05 |
| Fno | 2.90 | 3.71 | 3.93 |
| ω (°) | 43.0 | 17.5 | 6.5 |
| D5 | 1.000 | 13.590 | 31.909 |
| D12 | 16.499 | 4.981 | 1.000 |
| D18 | 1.002 | 1.642 | 2.192 |
| D22 | 1.510 | 8.470 | 16.406 |
| D24 | 2.495 | 2.737 | 0.984 |
| fb | 1.100 | 1.100 | 1.100 |

Figure 6A:
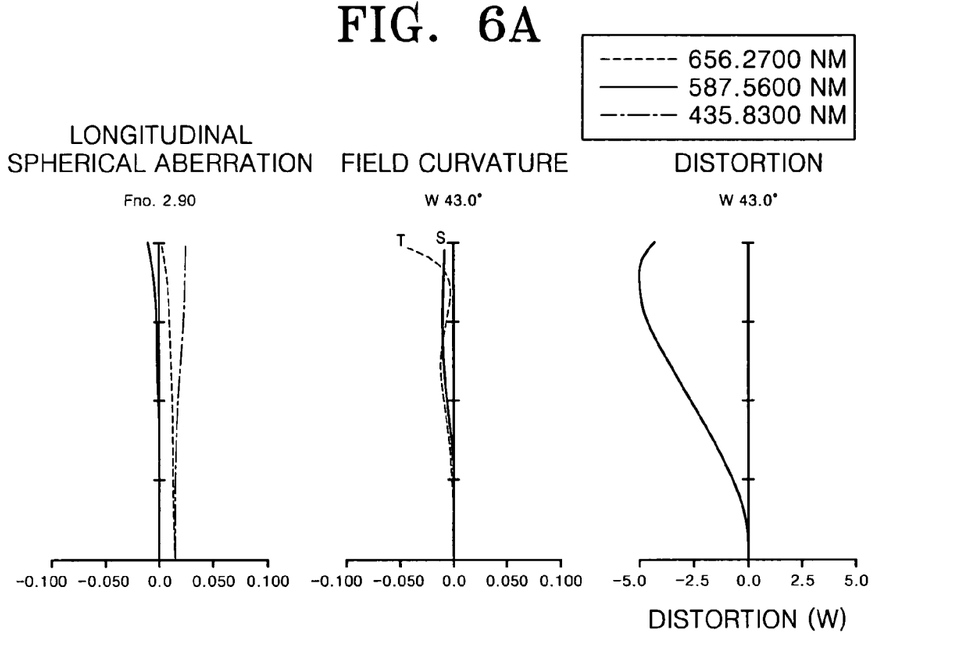
FIG. 6A illustrates spherical aberration, astigmatic field curvature, and distortion at the wide angle position of the zoom lens according to the embodiment illustrated in FIGS. 5A-5C.
Figure 6B:
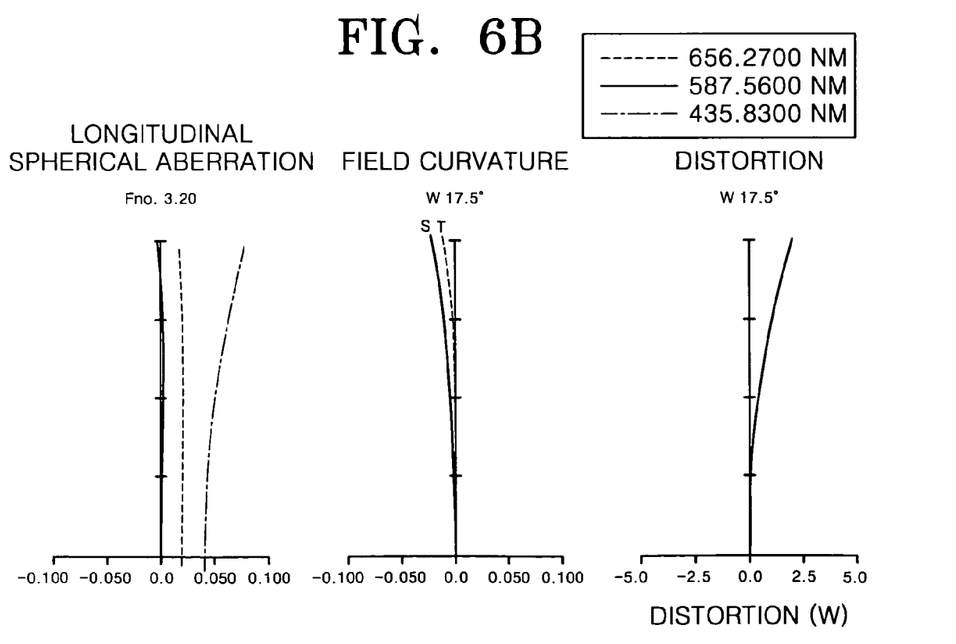
FIG. 6B illustrates the spherical aberration, astigmatic field curvature, and distortion at the media angle position of the zoom lens according to the embodiment illustrated in FIGS. 5A-5C.
Figure 6C:
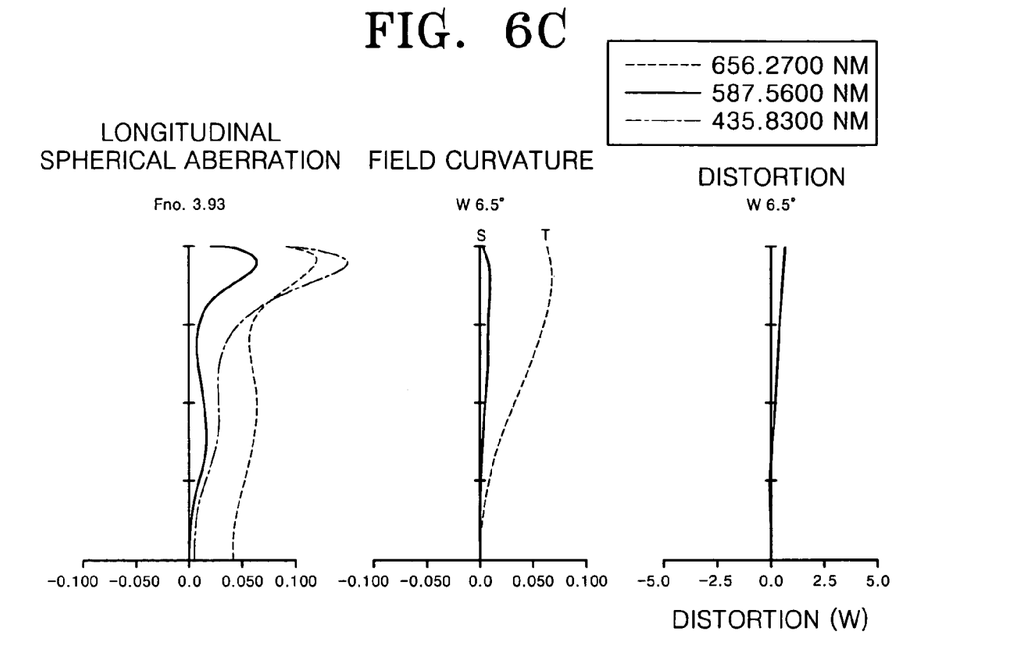
FIG. 6C illustrates the spherical aberration, astigmatic field curvature, and distortion at the telephoto position of the zoom lens according to the embodiment illustrated in FIGS. 5A-5C.
Figure 7:
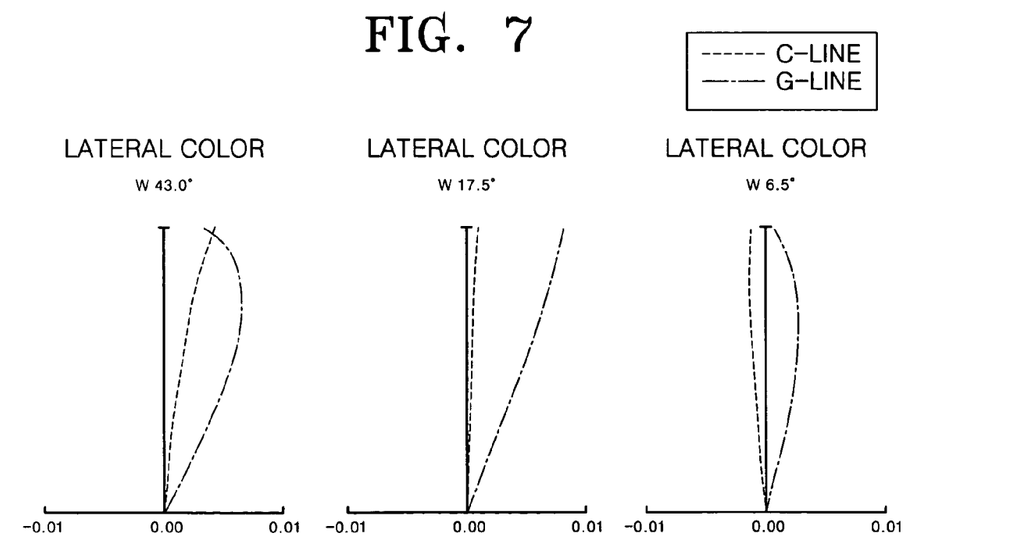
FIG. 7 illustrates lateral colors at the wide angle position, the medium angle position, and the telephoto position of the zoom lens according to the embodiment illustrated in FIGS. 5A-5C.

FIGS. 6A-6C illustrate spherical aberration, astigmatic field curvature, and distortion at the wide angle position, the medium angle position and the telephoto position of the zoom lens according to the second embodiment of the present invention.

Third Embodiment

Figure 8:
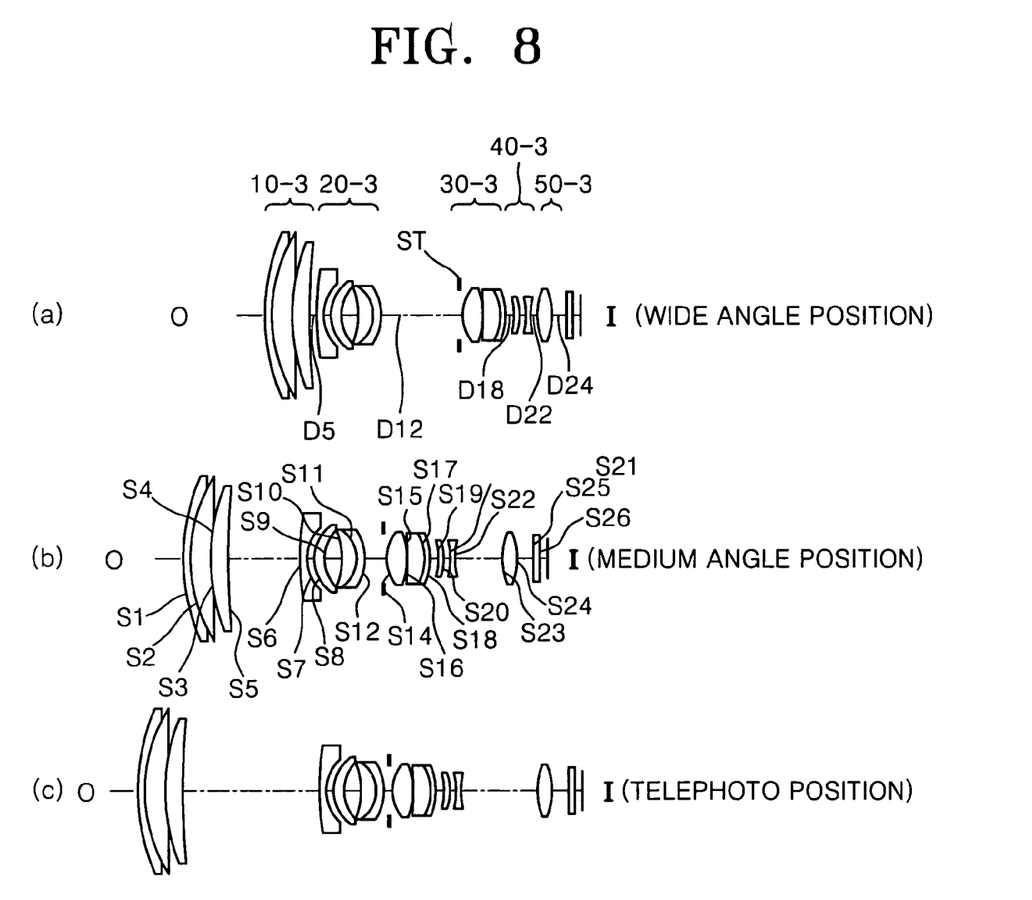
FIGS. 8A-8C illustrate structures of a zoom lens with a wide angle of view and a high zooming ratio at a wide angle position, a medium angle position, and a telephoto position, respectively, according to still another embodiment of the present invention.

FIGS. 8A-8C illustrate structures of a zoom lens with a wide angle of view and a high zooming ratio at a wide angle position, a medium angle position, and a telephoto position, respectively, according to a third embodiment of the present invention. The zoom lens according to the current embodiment includes first through fifth lens groups 10-3 through 50-3.

TABLE 7

| Lens surface | R | D | Refraction index (Nd) | Vd |
|---|---|---|---|---|
| S1 | 50.026 | 1.00 | 1.84666 | 23.8 |
| S2 | 35.916 | 4.99 | 1.48749 | 70.2 |
| S3 | 611.936 | 0.10 | | |
| S4 | 40.655 | 3.03 | 1.49700 | 81.5 |
| S5 | 104.083 | Variable (D5) | | |
| S6 | 84.311 | 1.30 | 1.83481 | 42.7 |
| S7 | 8.276 | 1.56 | | |
| S8 | 10.110 | 1.25 | 1.80500 | 40.7 |
| S9 | 6.685 | 3.82 | | |
| S10 | −18.173 | 2.62 | 1.84666 | 23.8 |
| S11 | −7.553 | 1.37 | 1.77250 | 49.6 |
| S12 | −35.161 | Variable (D12) | | |
| ST | Infinite | 0.80 | | |
| S14 | 8.991 | 4.00 | 1.52540 | 70.4 |
| S15 | −19.349 | 0.10 | | |
| S16 | 40.392 | 3.04 | 1.49700 | 81.5 |
| S17 | −9.908 | 2.17 | 1.84666 | 23.8 |
| S18 | −13.073 | Variable(D18) | | |

TABLE 7-continued

| Lens surface | R | D | Refraction index (Nd) | Vd |
|---|---|---|---|---|
| S19 | −21.337 | 2.36 | 1.48749 | 70.2 |
| S20 | −9.221 | 1.03 | | |
| S21 | −7.233 | 1.00 | 1.83824 | 24.8 |
| S22 | 300.000 | Variable(D22) | | |
| S23 | 19.995 | 2.58 | 1.51680 | 64.2 |
| S24 | −17.691 | Variable (D24) | | |
| S25 | Infinite | 1.22 | 1.51680 | 64.2 |
| S26 | Infinite | Fb | | |

Table 8 shows aspheric coefficients of the zoom lens according to the third embodiment of the present invention.

TABLE 8

| Lens surface4e | K | A | B | C | D |
|---|---|---|---|---|---|
| S8 | −1.000 | 2.64228E−04 | 1.57731E−06 | 2.09852E−08 | 5.19983E−10 |
| S14 | −1.000 | −7.46522E−05 | −7.92592E−06 | 3.71638E−07 | −7.59090E−09 |
| S15 | −1.000 | 4.30120E−05 | −7.15992E−06 | 3.98935E−07 | −8.02881E−09 |
| S22 | −1.000 | 4.57512E−04 | −3.78260E−06 | 1.56296E−06 | −7.95595E−08 |

Table 9 shows examples of focal length, F number, half field angle, and variable distances D5, D12, D18, D22, and D24 at the wide angle position, the medium angle position, and the telephoto position in the zoom lens according to the third embodiment of the present invention.

TABLE 9

| | Wide angle | Medium angle | Telephoto |
|---|---|---|---|
| f | 4.14 | 11.50 | 32.04 |
| Fno | 2.90 | 3.20 | 3.93 |
| ω (°) | 43.1 | 17.5 | 6.5 |
| D5 | 1.000 | 14.186 | 33.130 |
| D12 | 16.819 | 5.475 | 2.066 |
| D18 | 1.000 | 1.790 | 2.535 |
| D22 | 1.500 | 6.752 | 15.163 |
| D24 | 2.332 | 3.814 | 1.757 |
| fb | 1.100 | 1.100 | 1.100 |

Figure 9A:
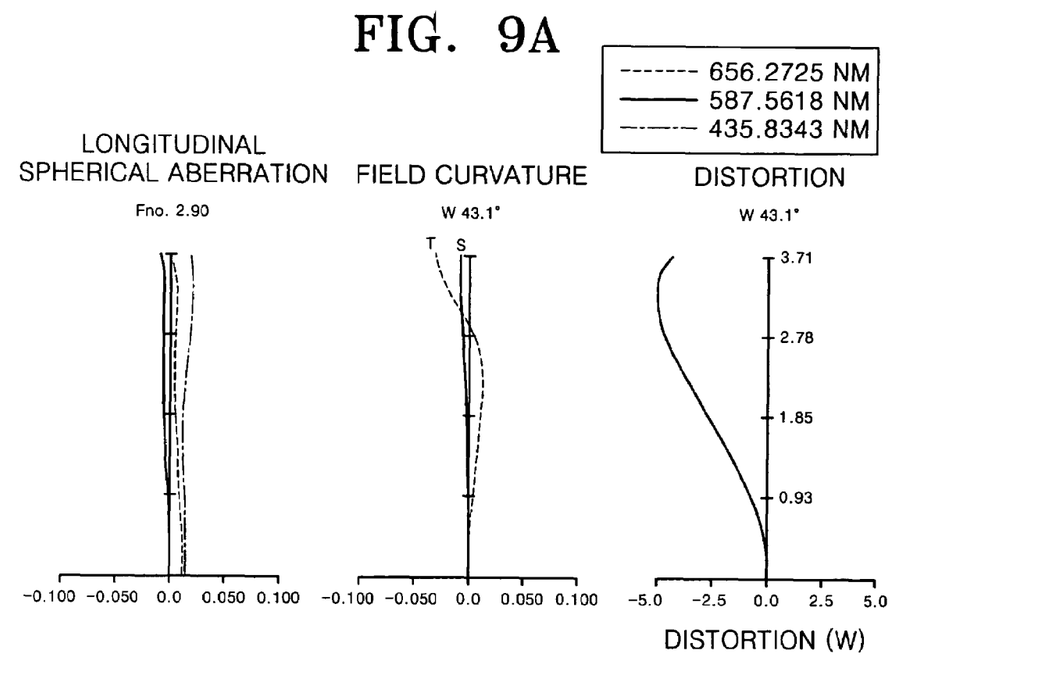
FIG. 9A illustrates spherical aberration, astigmatic field curvature, and distortion at the wide angle position of the zoom lens according to the embodiment illustrated in FIGS. 8A-8C.
Figure 9B:
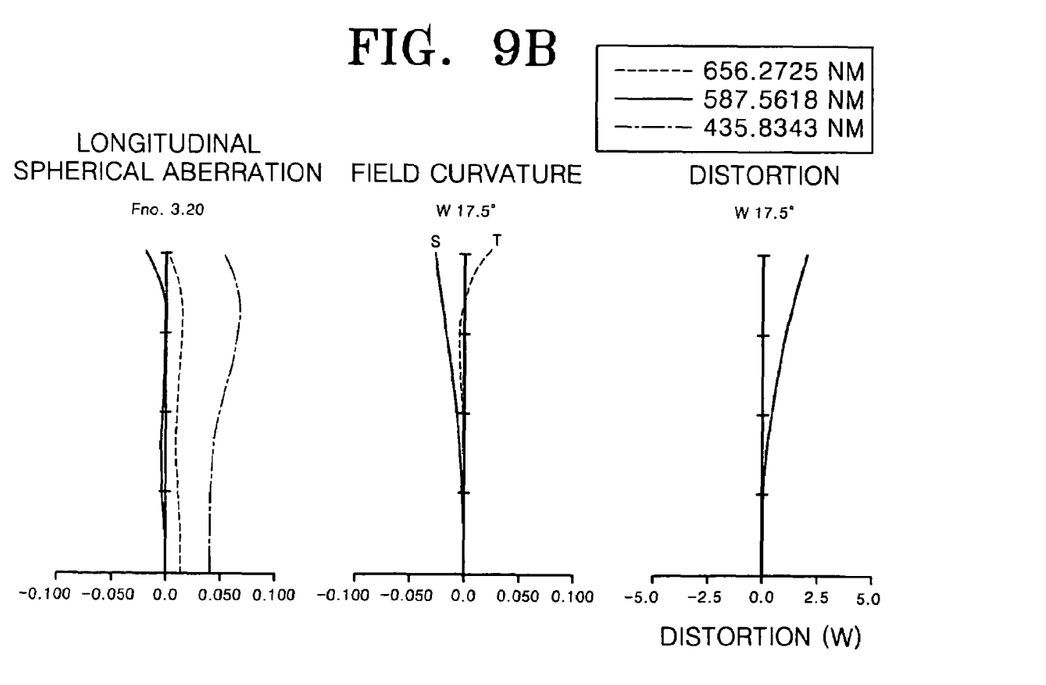
FIG. 9B illustrates the spherical aberration, astigmatic field curvature, and distortion at the medium angle position of the zoom lens according to the embodiment illustrated in FIGS. 9A-9C.
Figure 9C:
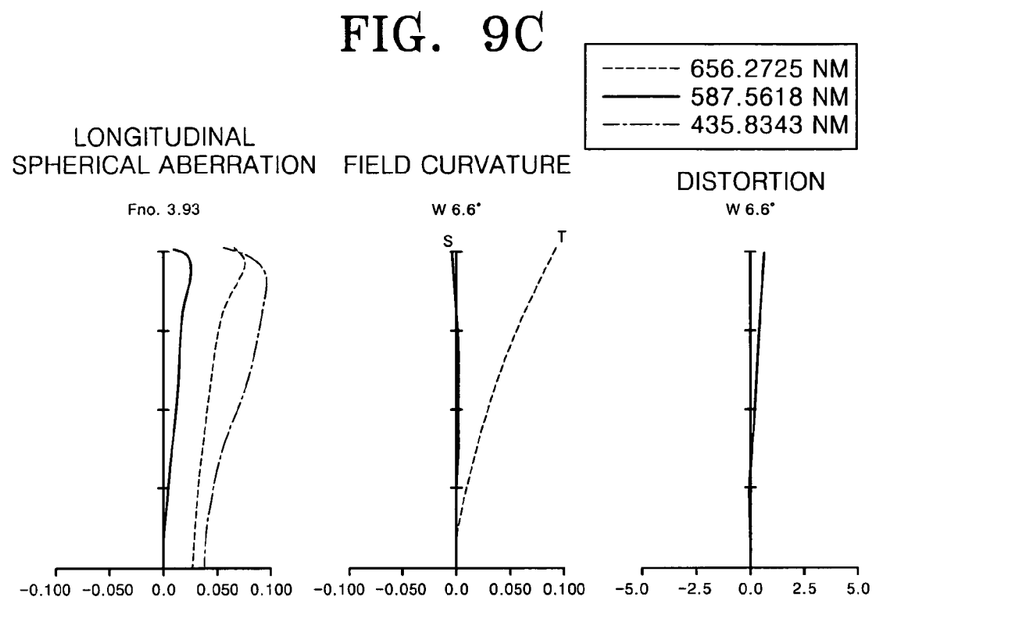
FIG. 9C illustrates the spherical aberration, astigmatic field curvature, and distortion at the telephoto position of the zoom lens according to the embodiment illustrated in FIGS. 9A-9C.
Figure 10:
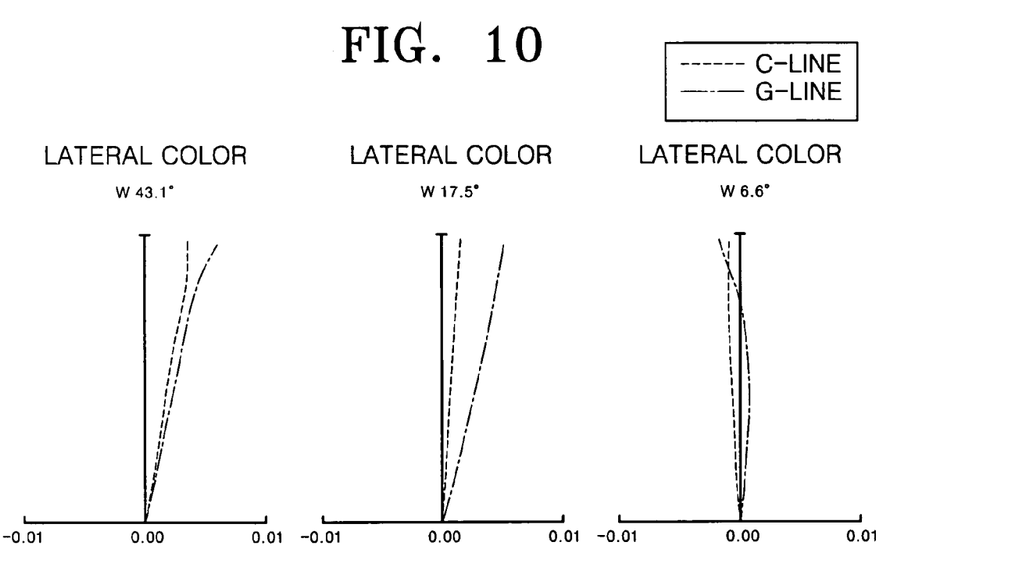
FIG. 10 illustrates lateral colors at the wide angle position, the medium angle position, and the telephoto position of the zoom lens according to the embodiment illustrated in FIGS. 9A-9C.

FIGS. 9A-9C illustrate spherical aberration, astigmatic field curvature, and distortion at the wide angle position, the medium angle position and the telephoto position of the zoom lens according to the third embodiment of the present invention.

The zoom lenses according to the first through third embodiments of the present invention satisfy the following conditions defined by Equations (1) through (5).

TABLE 10

| Equation | First embodiment | Second embodiment | Third embodiment |
|---|---|---|---|
| $-0.65 < \frac{f_w}{f_2} < -0.54$ | −0.627 | −0.575 | −0.613 |
| fω | 4.140 | 4.141 | 4.140 |
| f2 | −6.608 | −7.196 | −6.754 |
| $-0.6 < \frac{f_w}{f_4} < -0.32$ | −0.364 | −0.446 | −0.361 |
| f4 | −11.361 | −9.280 | −11.457 |

TABLE 10-continued

| Equation | First embodiment | Second embodiment | Third embodiment |
|---|---|---|---|
| $1.49 < N_{3,4gp} < 1.53$ | 1.50330 | 1.50330 | 1.50330 |
| $70 < V_{3,4gp} < 80$ | 74.07 | 74.07 | 74.07 |
| $0 < V_{4gp} - V_{4gn} < 47$ | 45.45 | 45.46 | 45.45 |

The present invention provides a compact, high-performance zoom lens having a high zooming ratio of about 8× and a wide angle of view that can be used in an imaging device such as a CCD with a small pixel pitch at a half field angle of 43° at a wide angle position. In particular, the zoom lens of the present invention has an ultra-wide angle as a half field angle of about 43° at the wide angle position and a high zooming ratio of about 8×. That is, the present invention can realize a common focal length of 24 mm to 20 mm from wide angle to telephoto in the 35 mm format with a single zoom lens. The present invention also provides a high performance camera employing the zoom lens.

As described above, the present invention provides a zoom lens with a wide angle of view and a high zooming ratio that includes five lens groups that are positive, negative, positive, negative, and positive, respectively. The present invention suppresses aberrations generated in achieving both a wider angle of view and a high zooming ratio through the third and fourth lens groups, thereby providing a high performance zoom lens.

The present invention also provides a high performance photographing device such as a classic or a video camera employing a zoom lens with a wide angle of view and a high zooming ratio.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A zoom lens comprising a first lens group having a positive refractive power, a second lens group having a negative refractive power, a third lens group having a positive refractive power, a fourth lens group having a negative refractive power, and a fifth lens group having a positive refractive power, wherein the first through fifth lens groups are sequentially arranged from an object side toward an image side, wherein the first through fifth lens groups are moved during zooming between a wide angle position to a telephoto position, thereby increasing the distance between the first and second lens groups, between the third and fourth lens groups, and between the fourth and fifth lens groups, and decreasing the distance between the second and third lens groups; and wherein the fourth lens group comprises a positive meniscus lens having a concave surface toward the object side and a negative lens arranged sequentially from the object side.

2. The zoom lens of claim 1, wherein the positive lens is separated from the negative lens by an air gap.

3. The zoom lens of claim 1, wherein the third lens group includes a double convex lens having an aspherical surface and a doublet comprising a positive lens having a strong convex surface toward the image side and a negative meniscus lens, wherein the double convex lens and the doublet are sequentially arranged from the object side toward the image side.

4. The zoom lens of claim 1, wherein the second lens group satisfies $$-0.65 < \frac{f_w}{f_2} < -0.54,$$

where $f_w$ and $f_2$ are an entire focal length at a wide angle position and a focal length of the second lens group, respectively.

5. The zoom lens of claim 1, wherein the fourth lens group satisfies $$-0.6 < \frac{f_w}{f_4} < -0.32,$$

where $f_w$ and $f_4$ are an entire focal length at a wide angle position and a focal length of the fourth lens group, respectively.

6. The zoom lens of claim 1, wherein the third and fourth lens groups satisfy $1.49<N_{3,4gp}<1.53$ and $70<V_{3,4gp}<80$, where $N_{3,4gp}$ denotes a refractive index for d-Line of the positive lenses in the third and fourth lens groups and $V_{3,4gp}$ denotes an Abbe number for d-Line of the positive lenses in the third and fourth lens groups.

7. The zoom lens of claim 1, wherein the fourth lens group satisfies $0<V_{4gp}-V_{4gn}<47$,
where $V_{4gp}$ and $V_{4gn}$, respectively, denote Abbe numbers of the positive and negative lenses in the fourth lens group.

8. A camera including the zoom lens of claim 1.

9. A zoom lens comprising:
a first lens group having a positive refractive power, a second lens group having a negative refractive power, a third lens group having a positive refractive power, a fourth lens group having a negative refractive power, and a fifth lens group having a positive refractive power, wherein the first through fifth lens groups are sequentially arranged from an object side toward an image side,
wherein the first through fifth lens groups are moved during zooming between a wide angle position to a telephoto position, thereby increasing the distances between the first and second lens groups, between the third and fourth lens groups, and between the fourth and fifth lens groups, and decreasing the distance between the second and third lens groups; and
wherein the fifth lens group consists of a single lens.

10. The zoom lens of claim 9, wherein the fourth lens group includes a positive meniscus lens having a concave surface toward the object side and a negative lens separated from the positive meniscus lens by an air gap, wherein the positive meniscus lens and the negative lens are arranged sequentially from the object side toward the image side.

11. The zoom lens of claim 9, wherein the third lens group includes a double convex lens having an aspherical surface and a doublet consisting of a positive lens having a strong convex surface toward the image side and a negative meniscus lens, wherein the double convex lens and the doublet are sequentially arranged from the object side toward the image side.

12. The zoom lens of claim 9, wherein the second lens group satisfies $$-0.65 < \frac{f_w}{f_2} < -0.54,$$

where $f_w$ and $f_2$ are an entire focal length at a wide angle position and a focal length of the second lens group, respectively.

13. The zoom lens of claim 9, wherein the fourth lens group satisfies $$-0.6 < \frac{f_w}{f_4} < -0.32,$$

where $f_w$ and $f_4$ are an entire focal length at a wide angle position and a focal length of the fourth lens group, respectively.

14. The zoom lens of claim 9, wherein the third and fourth lens groups satisfy $1.49<N_{3,4gp}<1.53$ and $70<V_{3,4gp}<80$, where $N_{3,4gp}$ denotes a refractive index for d-Line of the positive lenses in the third and fourth lens groups, and $V_{3,4gp}$ denotes an Abbe number for d-Line of the positive lenses in the third and fourth lens groups.

15. The zoom lens of claim 9, wherein the fourth lens group satisfies $0<V_{4gp}-V_{4gn}<47$,
where $V_{4gp}$ and $V_{4gn}$, respectively, denote Abbe numbers of the positive and negative lenses in the fourth lens group.

16. A camera including the zoom lens of claim 9.

* * * * *